United States Patent [19]
Dohse et al.

[11] Patent Number: 4,502,824
[45] Date of Patent: Mar. 5, 1985

[54] TOOL CHUCK

[75] Inventors: Hans-Peter Dohse, Grafenau; Karl Wanner, Leinfelder, both of Fed. Rep. of Germany

[73] Assignee: Robert Bosch GmbH, Stuttgart, Fed. Rep. of Germany

[21] Appl. No.: 393,369

[22] Filed: Jun. 29, 1982

Related U.S. Application Data

[63] Continuation-in-part of Ser. No. 263,463, May 13, 1981, abandoned, which is a continuation-in-part of Ser. No. 971,372, Dec. 20, 1978, abandoned.

[30] Foreign Application Priority Data

Mar. 16, 1978 [DE] Fed. Rep. of Germany ....... 2811328

[51] Int. Cl.³ .................. B23C 9/00; B23B 31/22; E02D 7/02
[52] U.S. Cl. ................................ 409/234; 173/13; 173/48; 279/1 B
[58] Field of Search ............... 279/19, 1 ME, 1 B, 74, 279/75, 76, 78, 79, 80, 82; 409/232, 234; 173/13, 48

[56] References Cited

U.S. PATENT DOCUMENTS

| | | | |
|---|---|---|---|
| 3,251,605 | 5/1966 | Ondeck | 279/82 |
| 3,428,327 | 2/1969 | Sindelar | 279/82 |
| 4,107,949 | 8/1978 | Wanner et al. | 279/75 X |
| 4,131,165 | 12/1978 | Wanner et al. | 279/75 X |
| 4,434,859 | 3/1984 | Rumpp et al. | 279/75 X |

FOREIGN PATENT DOCUMENTS 211629 10/1960 Austria ................... 279/75

Primary Examiner—William R. Briggs
Attorney, Agent, or Firm—Michael J. Striker

[57] ABSTRACT

A tool chuck for a hammer drill has an inner sleeve and an axially slidable outer sleeve concentrically surrounding the inner sleeve. The inner sleeve has an open leading end adapted to receive a shank of the tool. The shank is clamped in the inner sleeve with a snap action in response to insertion of the shank through the open end. Torque and/or axial impact are selectively imparted to the tool chuck from a drive of the hammer drill. The tool shank is formed with a radially outwardly opening recess closed at both axial ends and shaped to receive a tool-holding element and with at least one axially extending groove. A formation is formed in the inner sleeve which is engageable with the axially extending groove for torque transmission. A ring is positioned between the outer sleeve and the inner sleeve. The ring is movably biased by a spring in axial direction and is provided with a projection engageable with the tool-holding element when the latter is moved outwardly of the recess.

20 Claims, 6 Drawing Figures

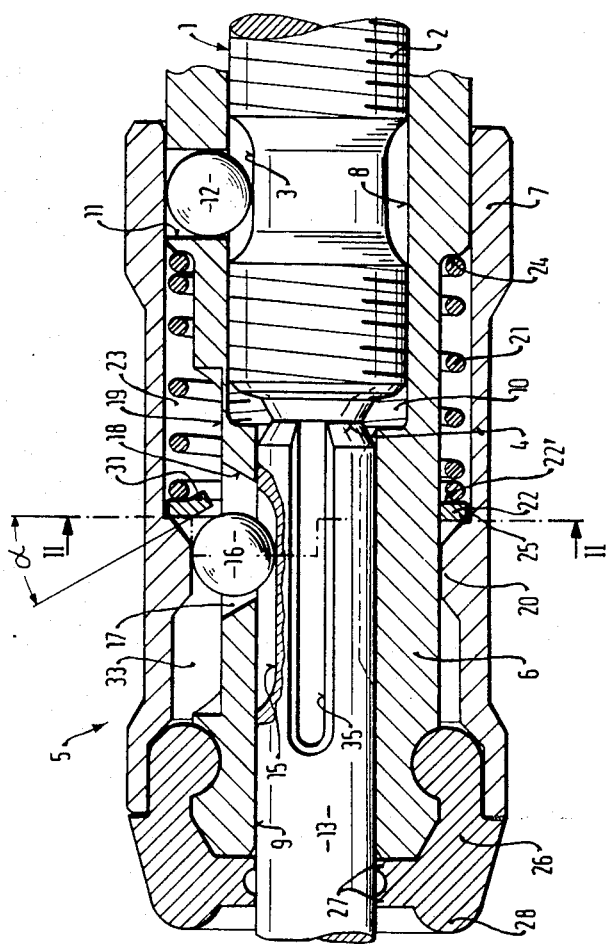
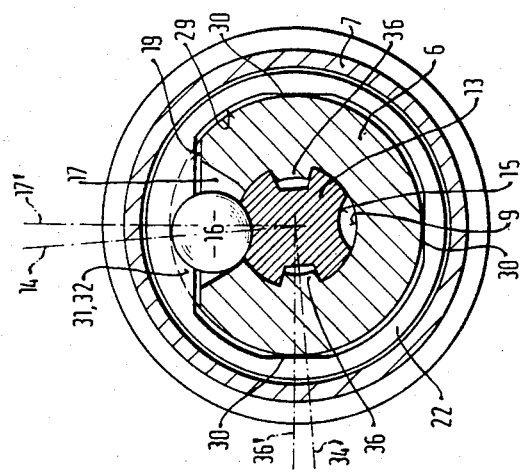

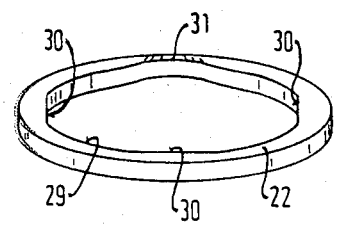
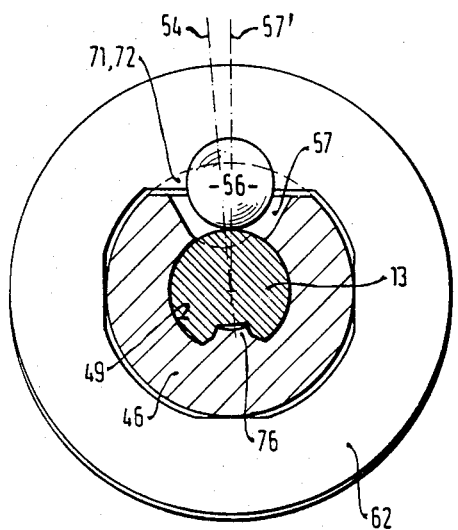
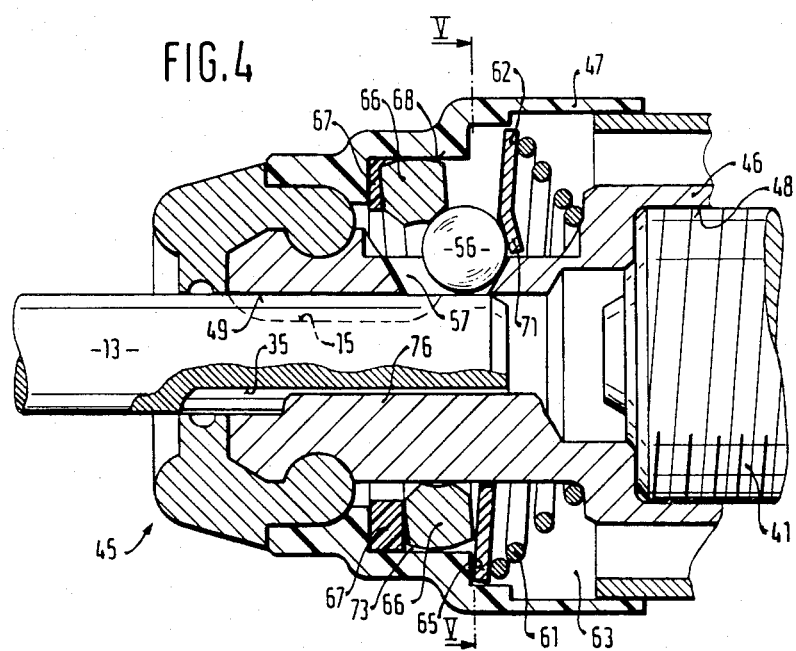

TOOL CHUCK

CROSS-REFERENCE TO RELATED APPLICATION

This application is a continuation-in-part of the application Ser. No. 263,463 filed May 13, 1981, which in turn is a continuation-in-part of the application Ser. No. 971,372, filed Dec. 20, 1978 both now abandoned.

BACKGROUND OF THE INVENTION

The present invention relates to tool chucks, and more particularly to tool chucks for tools for imparting torque and/or axial impacts to a tool, such as hammer drills.

It is known in the prior art to provide a tool chuck or tool holder which includes an inner sleeve adapted to receive a tool shank and an outer sleeve which is axially slidable relative to the inner sleeve. The known tool holders are provided with a plurality of balls movable radially from a first position in which they at least partially extend into the interior of the inner sleeve so as to engage corresponding longitudinal recesses formed on the tool shank, and a second position radially away from the first position so as to free the interior of the inner sleeve and to thus permit axial movement of the tool shank relative to the inner sleeve. The radial movement of the balls is prevented by the outer sleeve which keeps the balls radially locked in the slots formed in the inner sleeve. In order to insert or withdraw the tool shank from the inner sleeve an operator should axially displace the outer sleeve relative to the inner sleeve so as to permit radial movement of the balls in order to release the tool holder. It is to be understood that such manipulations of the sleeves make the operation of the known tool holders rather complicated and bothersome for an operator.

SUMMARY OF THE INVENTION

It is an object of the present invention to provide an improved tool holder, for example for a hammer drill, which avoids the disadvantages of the prior art tool holders.

More particularly, it is an object of the present invention to provide a tool chuck which is easy and reliable in operation.

Still another object of the invention is to provide a tool chuck in which the insertion or withdrawal of the tool shank from the tool holder is significantly facilitated.

Still further object of the invention is to provide a tool chuck of substantially reduced costs.

These and other objects of the invention are attained by a tool chuck, comprising an elongated inner sleeve having one end adapted to receive a tool shank and another end directed toward the tool drive, said inner sleeve having a central axis; an elongated outer sleeve concentrically surrounding the inner sleeve and defining an annular clearance with the same, the outer sleeve being adapted to slide relative to said inner sleeve in the axial direction, the tool shank being formed with an axially extending recess, the inner sleeve being provided with an opening extending in a radial direction; a ball-shaped element located in the radially extending opening and engaging the axially extending recess; and a ring surrounding the inner sleeve and movably biased in the axial direction within said annular clearance, the ring having a surface adapted to engage the ball-shaped element in the assembly, the ball-shaped element and the ring being operative for releasably coupling the tool shank to said sleeves in response to the insertion of the tool shank into the inner sleeve under pressure exerted on the tool shank in the axial direction.

The ring may be of sheet metal and may be provided with a formation having the surface adapted to engage the ball-shaped element when the latter is displaced in the axial direction. This formation may be a mushroom-like projection directed towards the drive means of the tool machine. This projection may be inclined at an angle about 35° to the side surface of the ring.

It is advantageous that the ring is fabricated of sheet metal by deforming the formation out of the periphery of the ring without requiring of utilization of cutting tools.

The mushroom-like projection of the ring may have an enlarged portion, the width of said enlarged portion along its chord being two times greater than the width of the remaining portion of the ring.

The inner sleeve of the tool holder according to the invention may be formed with a longitudinal groove in the outer surface thereof in the region of the annular clearance, said enlarged portion being positioned in the longitudinal groove.

The ring may be further provided with at least three radially widened portions circumferentially spaced from each other, the ring being positioned on the inner sleeve with a relatively small play.

The tool chuck may further include a spring positioned in the annular clearance, which spring urges the ring in a direction toward said one end of the inner sleeve.

The tool chuck of the invention may be provided with a supporting ring inserted into the annular clearance immediately before the ring in the axial direction and a stop ring of elastic material abutting on the supporting ring and elastically limiting the movement of the supporting ring in the axial direction toward said one end of the inner sleeve.

It is particularly advantageous that the tool shank may be formed with at least one radially open groove formed in the outer surface thereof and extending in the axial direction, and closed at both its ends, the inner sleeve being formed with at least one strip-like projection engaging with said groove and extending through a central axis which is offset about 5° relative to the central axis of the radially extending opening of the inner sleeve. Due to such arrangement the ball-shaped element is not loaded by torque transmitted to a tool shank from the drive means of the tool machine even when the interengaging formations such as aforementioned groove and projection are subjected to a relatively strong wear.

The novel features which are considered as characteristic for the invention are set forth in particular in the appended claims. The invention itself, however, both as to its construction and its method of operation, together with additional objects and advantages thereof will be best understood from the following description when taken with the accompanying drawings.

BRIEF DESCRIPTION OF THE DRAWING

FIG. 1 is a longitudinal sectional view of a tool chuck according to the invention;

FIG. 2 is a cross-section taken through the line II—II of FIG. 2;

FIG. 3 is a perspective view of a ring of sheet metal;

FIG. 4 is a longitudinal sectional view of a tool chuck in accordance with a second embodiment of the invention;

FIG. 5 is a cross-section taken through the line V—V of FIG. 4; and

DETAILED DESCRIPTION OF THE PREFERRED EMBODIMENTS

Figure 6:
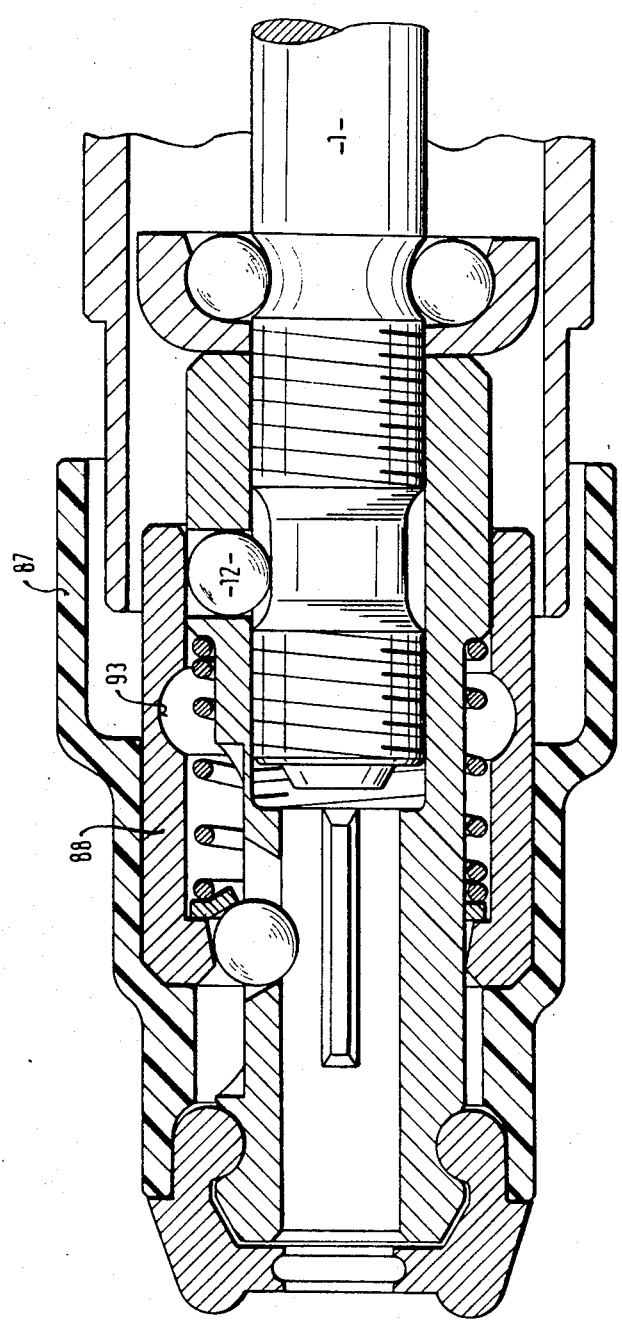
FIG. 6 is a longitudinal sectional view of a tool chuck in accordance with a third embodiment of the invention.

Referring now to the drawings, and first to FIG. 1, it may be seen that the reference character 1 designates a front portion of a hammer drill the remaining part of which is not illustrated. This hammer drill has a form of a tool spindle which is adapted to impart torque and/or axial impact to a tool. The hammer drill is provided with known per se means for transmission of torque, such as splined shaft 2 outwardly extended from the housing of the hammer drill (not shown). The splined shaft 2 is formed with a circumferential groove 3 provided on the front end portion thereof, the groove 3 having a depth corresponding to the depth of the recess in between the splines of the splined shaft 2. The tool spindle 1 at its front portion has an end face 4.

In FIG. 1 a tool holder 5 is shown including an inner coupling sleeve 6 made from steel and an outer sleeve 7 which surrounds the sleeve 6 and is axially movable relative to the same. The outer sleeve 7 may be formed of steel or plastic material. The inner coupling sleeve 6 having a central longitudinal axis is formed with two coaxial bores 8 and 9 of different diameters of which the rear bore 8 facing towards the hammer drill is of a greater diameter whereas the second bore 9 which is open at the leading end thereof is of a smaller diameter. The inner surface of the sleeve 6 in the region of the bore 8 is formed with a splined profile corresponding to that of the shaft 2 of the spindle.

The coupling sleeve 6 is provided in the region thereof adjacent to the hammer drill with a radial hole 11 which receives a radially movable ball 12. The ball 12 engages the outer surface of the tool spindle 1 thereby interlocking the inner sleeve 6 on the tool spindle 1. The radial hole 11 is covered from the outside of the inner sleeve 6 to the inner surface of the outer sleeve 7 so as to prevent dropping out of the ball 12 therefrom. The groove 3 has an axial dimension exceeding the diameter of the ball 12 which provides a certain degree of freedom in axial direction relative to the tool spindle 1.

A front end portion of the front bore 9 receives a tool shank 13. The trailing end portion of the tool shank 13 has an end face abutting on the end face 4 of the leading portion of the spindle 1. These two thus arranged end faces directly transmit axial impact from the spindle 1 to the shank 13 of the tool.

The tool shank 13 is further provided on its outer circumference with two circumferentially opposite recesses 15 extending through a central angular axis 14 as clearly shown in FIG. 2. Additionally, two diametrically opposite grooves 35 are formed on the trailing portion of the shank 13, which grooves extend through a central angular axis 34 which is normal to the axis 14. The inner wall of the inner sleeve 6 in the region of the bore 9 is provided with two circumferentially spaced strip-shaped projections 36 which are located diametrically opposite relative to one another and have substantially radially extending flat side wall portions. The projections 36 engage grooves 35 and extend through a central axis 34 which is offset about 5° relative to the axis 36' which in turn is perpendicular to an axis 17' which is a central line of a slot 17 adapted to receive a ball 16. Due to such an arrangement it is warranted that the ball 16 will not be loaded by torque transmitted to the shank 13 from the spindle 1 even when the projections 36 will be subject to a strong wear.

As clearly seen in FIG. 1 the upper recess 15 engages the ball 16 which is inserted in the radial slot 17 formed in the inner sleeve 6. The ball 16 is radially and axially displaceable in the slot 17. The slot 17 is arranged in the form of an elongated slit extending parallel to the elongation of the sleeve 6 and has its wall surface converging towards the inner surface of the sleeve 6, in other words in a direction towards the central axis of the tool shank 13. At least the surface 18 of the radial slot 17 is inclined relative to the normal plane of the tool shank 13 at an angle about approximately 30° whereby the radial slot 17 is enlarged radially outwardly. As seen in FIG. 1 the radial slot 17 is located somewhat in the middle of a longitudinal groove or countersink 19 provided in the outer surface of the sleeve 6. The groove 19 forms a flat surface which is perpendicular to the plane of the drawing.

The diameter of the ball 16 corresponds to that of the ball 12 in the preferred embodiment. The ball 12 is so dimensioned that it at least partially extends beyond the outer surface of the inner coupling sleeve 6 in the clearance between the outer surface of the sleeve and the inner surface of outer sleeve 7. When the tool shank 13 is inserted into the sleeve 6 a portion of the radial slot 17 is covered with a projection 20 which extends radially inwardly from the inner surface of sleeve 7. The inner diameter of the projection 20 is so dimensioned as to prevent any radial displacement of the ball 16 relative to the inner sleeve 6 when the latter is in assembly with the tool shank 13.

The inner sleeve 6 defines with the inner surface of the outer sleeve 7 an annular clearance 23. A sheet-like ring element 22 loaded by a spring 21 is located in the clearance 23 in the region of the groove 19 and covers a portion of the radial slot 17 when the inner sleeve 6 receives the tool shank 13. The clearance 23 is axially defined at one side thereof by a shoulder 24 formed on the outer surface of the sleeve 6, and at the other side thereof by a shoulder 25 formed on the inner surface of the outer sleeve 7. The shoulder 25 constituted by a side wall of the projection 20 and the face surface of the ring element 22 directed toward the ball 16 form a chamber inclined toward the central axis of the tool shank at about 40°.

The sheet-like ring element 22 is axially movable in the clearance 23 along the outer circumference of sleeve 6 and is urged by the spring 21 against the shoulder 25. The spring 21 extends between the flat ring element 22 which abuts on one end of the spring and the middle portion of the sleeve 7 when the tool shank is in assembly as shown in FIG. 1.

The tool holder 5 is provided at its front side with a profiled ring member 26 having flanges engaged within a circumferential space formed between the inner surface of the outer sleeve 7 and the outer surface of the sleeve 6. The profiled ring member 26 is formed as a cup-like protecting lid having sealing lips 27 surrounding the tool shank 13. The front outer portion of the ring member 26 is formed with a ring head 28. In order to reliably seal the interior of the inner sleeve 6 the ring member 26 extends in the axial direction so as to overlap the front portion of the sleeve 6.

As can be observed in FIG. 1, the ring element 22 is arranged with in the clearance 23 with a relatively small clearance of motion (i.e. play) in a radial direction. The diameter of the inner opening 29 of the ring element 22 is approximately 1 mm greater than the outer diameter of the inner sleeve 6 in the area of the element 22. As can be observed in FIG. 2 the ring element 22 has circumferentially spaced enlarged portions 30 having such a width along their chords that these portions tangentially contact the outer circumference of the inner sleeve 6. Due to such an arrangement the ring element 22 is supported on the circumference of the inner sleeve 6 with a small play.

As was noted above ball 16 comes into contact with the ring element 22 in the region of its bore 29. This region is defined by a mushroom-like projection or buckling 31 formed out of the ring element 22. This projection at least partially engages the ball 16 when the latter moves in the axial direction. The projection 31 is formed at the side of the ring facing towards the hammer drill and is inclined at an angle about 30° relative to the rear side surface of the ring element. In the region of the projection 31 the ring element 22 is approximately of double width along its chord as compared to the remaining portion of the element 22. Due to such a construction the clearance between the outer surface of the groove 29 and the enlarged or widened portion 32 of the ring element 22 is approximately 0.5 mm.

The operation of the tool holder is the following:

Should the tool be withdrawn from the tool holder 5 (see FIGS. 1 and 2) then the outer sleeve 7 is to be displaced in direction against the biasing force of the spring 21, that is in direction towards the hammer drill. The ball 16 is then urged radially and outwardly into the front region 33 of the sleeve 7. The ball 16 thus leaves the recess 15 of the shaft 13 and the tool is free to be withdrawn. When the outer sleeve 7 is released by an operator the spring 21 will returned the sleeve 7 in the position shown in FIG. 1.

When a new tool is to be inserted into the tool holder 5, the shank 13 is placed first into the inner sleeve 6. The end face of the tool shank 13 moves in longitudinal direction, upon the movement of the tool shank 13 into the interior of the sleeve 6, and the ball 16 is pressed in direction against the ring element 22, particularly against the projection 31. The ball 16 moves along the slot 17 and thus displaces the ring element 22 in direction against the biasing force of the spring 21. The axis of traveling of the ball 16 occurs in a plane perpendicular to the plane of the drawing and lies approximately coaxial with a surface 22' shown in FIG. 1. Because the surface 22' remains substantially in the same position the outer sleeve 7 cannot be withdrawn from the tool holder in its inoperative position. The ball 16 eventually abuts against the inclined wall 18 and then is pressed radially outwardly into the clearance 23. The position shown in FIG. 1 corresponds to a working position of the tool holder 5. It is to be understood that eventually the whole interior of the inner sleeve 6 defined by the bore 9 is unobstructedly free for receiving the tool shank 13, the assembled position of which is shown in FIG. 1. Then, the spring 21 moves the ring element 22 and the ball 16 back into the position shown in FIG. 1 until the ball 16 again is placed into the slot 17 and pressed therein by the projection 20 of the outer sleeve 7.

In the working position as shown in FIG. 1 the tool shank 13 is interlocked with the inner sleeve 6 whereas the inner sleeve 6 is interlocked with the tool spindle 1. Should the whole tool holder 5 be withdrawn from the tool spindle 1 of the hammer drill then, first the profiled ring member 26 is withdrawn from its position between the inner sleeve 6 and the outer sleeve 7; the outer sleeve 7 then can be displaced all the way forward in a direction away from the spindle 1 until the ball 12 can be withdrawn radially outwardly from the radially hole 11.

In operation, working movement of the front end of the tool spindle 1 is transmitted to the tool shank 13. Axial impact is directly transmitted from the spindle 1 through the end face 4 to the end face of the tool shank. The torque is transmitted by splined connecting elements 2, 10 and via the projections 36 engaging with the corresponding grooves 35 on the tool shank 13. The common transverse angular axis 34 (FIG. 2) through which the projections 36 extend is offset about 5° relative to an axis 36' which is perpendicular to the central line 14 of the radial bore 17; this results in the angle of about 12° due to wear of projections 36; this prevents ball 16 from loading by torque. In other words, the single ball 16 serves only for axial interlocking of the tool shank 13 in the tool holder 5 when torque is transmitted from the spindle 1 to the shank 13 and this transmission is not affected even by considerable wear of the parts involved.

FIGS. 4 and 5 illustrate a second embodiment of the present invention in which a tool holder 45 is substantially similar to the tool holder 5 of the first embodiment. The rear portion of a spindle 48 is not illustrated in FIG. 4 but it is essentially similar to that described in FIG. 1. In the second embodiment, the tool shank 13 is formed with a single recess 15, the axis of which is opposite to the axis of radially outwardly open groove 35. As seen in FIG. 5, projection 76 extends through a transverse axis 54 which is offset about 5° relative to a central line 57' through which a radial slot 57 extends.

The distinction between the tool holder of the first embodiment and that of the second embodiment is that the inner sleeve 46 for receiving a drive spindle 41 is particularly suitable for spindles having greater diameters as compared to that of FIG. 1. This results of course in making a bore 48 of substantially greater diameter. The total length of the tool holder 45 depicted in FIG. 4 is essentially shorter than of the tool holder of the first embodiment. Therefore in the second embodiment the radial slot 57 formed in the inner sleeve 46 has a shape of an opening tapering in downward direction in place of the elongated slit provided in the first embodiment. A circumferential clearance 63 similar to the clearance 23 of the first embodiment is provide in the tool holder 45 to receive a ball 56 when the latter moves radially outwardly from the slot 57. In this embodiment the ball 56 is held in its interlocking position by a ring element 62 substantially similar to the element 22. The ring element 62 is also provided with a projection 71 having an enlarged portion 72. The tool holder 45 illustrated in FIG. 4 is in its assembled or working position where the ring element 62 is pressed by a conical spring 61 against a shoulder 65 formed in a sleeve 47. The slide sleeve 47 surrounding the spring 61 and the ring element 62 is formed preferably of plastic material. The slot 57 is at least partially covered with a supporting ring 66 made of metal or steel and located within the outer slide sleeve 47 immediately before the ring element 62 in the axial direction. The supporting ring 66 is also supported by the spring 61 via the ring element 62 against entering the clearance 63 at the side thereof facing towards the drive spindle 41. The movement or elastic impact of the supporting ring 66 is limited by an elastic stop ring 67 made from plastic material, preferably a foamed plastic material. In a released position the ring 67 has a square cross-section.

The operation of the second embodiment is substantially similar to the operation of the first embodiment. The distinction in operation between two embodiments resides in different function of the movable tool shank 13. When the tool shank 13 moves rearwardly the ball 56 moves outwardly of the slot 57 towards the tool spindle 41. The ball 56 is thus pressed against the projection 71 of the ring element 62 and against the biasing force of the conical spring 61. The supporting ring 66 has a rounded outer surface 68 contacting the inner surface of the plastic outer sleeve 47. This rounded surface serves to facilitate the movement of the tool in a forward direction. When the tool is inserted into the holder the ring 67 of foamed plastic material which has originally a square cross-section is deformed as seen in FIG. 4. The ring element 62 meanwhile moves rearwardly whereas the supporting ring 66 is displaced forwardly thereby freeing a room for the ball 56 which can move further radially outwardly. When the tool shank 13 further slides in a bore 49 in axial direction and comes into contact with the end face of the drive spindle 41 the ball 56 returns in its original interlocking position in which it engages with the recess 15 of the tool shank 13.

The supporting ring 66 prevents the ball 56 from dropping out of the tool holder 45 when the tool shank 13 is withdrawn from the holder.

FIG. 6 illustrates a third embodiment of the present invention which substantially corresponds to the tool holder of the first embodiment. The distinction of this embodiment from the first embodiment is that the slide outer sleeve 87 is made from a synthetic plastic material. Because the plastic material is not sufficiently wear-resistant an insert 88 of steel is placed between the outer sleeve 89 and the sleeve receiving the tool shank. The insert 88 is formed with a circumferential groove 93 adapted to receive the ball 12 which interlocks the tool holder with the tool spindle 13.

It will be understood that each of the elements described above, or two or more together, may also find a useful application in other types of tools chucks differing from the types described above.

While the invention has been illustrated and described as embodied in a tool chuck it is not intended to be limited to the details shown, since various modifications and structural changes may be made without departing in any way from the spirit of the present invention.

Without further analysis, the foregoing will so fully reveal the gist of the present invention that others can, by applying current knowledged, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool chuck for rotary and percussion tool machines, preferably a drill, comprising a coupling inner sleeve having one end connected to a driven member of the tool machine and another end receiving a tool shank, said inner sleeve having a central axis and being formed with a radial opening, said tool shank being formed with an axially extending recess; an outer sleeve concentrically surrounding said inner sleeve and defining an annular clearance with the same; a single ball engaged in said recess and extended into said radial opening so that it is axially displaceable in said recess and axially and radially displaceable in said radial opening; a sheet-like ring surrounding said inner sleeve; and spring means for loading said sheet-like ring in the direction of said ball and positioned in said annular clearance, said outer sleeve being provided with a means which at least partially axially overlaps said radial opening in the region thereof, which faces away from the tool machine, when said tool shank is received by said another end of the inner sleeve, so that said ball is held between said means and said inner sleeve and its radial displacement in said radial opening is prevented, said sheet-like ring being formed with an inner bore having a diameter and also having a projecting portion of reduced diameter near said inner bore, said portion of said sheet-like ring being engageable with said ball.

2. The tool chuck of claim 1, further comprising means for sealing said annular clearance.

3. The tool chuck of claim 1, wherein said sheet-like ring is provided with a formation defining said portion and adapted to engage said ball when the same is displaced in the axial direction.

4. The tool chuck of claim 3, wherein said formation is a mushroom-like projection directed towards said driven member.

5. The tool chuck of claim 4, wherein said projection is inclined at an angle about 35° to a plane of said ring.

6. The tool chuck of claim 5, wherein said projection has an enlarged portion, said enlarged portion having a chord, the width of said enlarged portion along said chord being two times greater than the width of the remaining portion of said ring.

7. The tool chuck of claim 6, wherein said inner sleeve is formed with a longitudinal groove in the outer surface thereof in the region of said annular clearance, said enlarged portion being positioned in said longitudinal groove.

8. The tool chuck of claim 7, wherein said inner bore of said sheet-like ring has a diameter which is at least 1mm greater than the outer diameter of said inner sleeve in the region of said ring.

9. The tool chuck of claim 8, wherein said ring has at least three enlarged portions circumferentially spaced from each other, said sheet-like ring being positioned on said inner sleeve with a small play.

10. The tool chuck of claim 2, wherein said sealing means include a profiled ring-shaped body arranged in the region of said one end of said inner sleeve.

11. The tool chuck of claim 9, wherein said outer sleeve is formed with a circumferential projection extending radially inwardly toward said inner sleeve, said projection forming a shoulder supporting said ring in the axial direction against the force of said spring means and constituting said means which at least partially overlaps said radial opening.

12. The tool chuck of claim 9, further including a supporting ring surrounding said inner sleeve constituting said means which at least partially overlaps said radial opening, said supporting ring being located in said annular clearance immediately before said sheet-like ring in the axial direction.

13. The tool chuck of claim 12, further including an elastic stop in said annular clearance, said stop having a side surface abutting against said supporting ring and elastically limiting the movement of the same in axial direction toward said one end.

14. The tool chuck of claim 13, wherein said stop is a ring surrounding said inner sleeve and made of elastic material.

15. The tool chuck of claim 14, wherein said stop is made of foamed plastic material.

16. The tool chuck of claim 15, wherein said supporting ring is made of metal.

17. The tool chuck of claim 15, wherein said supporting ring is made of steel.

18. The tool chuck of claim 16, wherein said supporting ring has an outer surface contacting the inner surface of said outer sleeve, said outer surface of said supporting ring being rounded.

19. The tool chuck of claim 1, wherein said tool shank is formed with at least one radially open groove formed in the outer surface thereof and extending in the axial direction and closed at both its axial ends, said inner sleeve being formed with at least one strip-like projection engaging with said open groove and having a central line, said radial opening of said inner sleeve having a central transverse axis, said central axis of said strip-like projection being offset about 5° relative to the central line of said radial opening in a direction of rotation of said inner sleeve.

20. The tool chuck of claim 10, wherein said radial opening has a tapered cross-section converging towards the interior of said inner sleeve and diverging radially outwardly relative thereto.

* * * * *